United States Patent
Jain

[11] Patent Number: 5,249,053
[45] Date of Patent: Sep. 28, 1993

[54] FILMLESS DIGITAL CAMERA WITH SELECTIVE IMAGE COMPRESSION

[75] Inventor: Jaswant R. Jain, Chatsworth, Calif.
[73] Assignee: Dycam Inc., Chatsworth, Calif.
[21] Appl. No.: 926,834
[22] Filed: Aug. 7, 1992

Related U.S. Application Data

[63] Continuation-in-part of Ser. No. 650,684, Feb. 5, 1991.
[51] Int. Cl.⁵ .............................................. H04N 5/30
[52] U.S. Cl. ..................... 358/209; 358/909; 358/906
[58] Field of Search ............ 358/209, 909, 906, 335, 358/427, 13, 432, 433, 12, 135-136

[56] References Cited
U.S. PATENT DOCUMENTS

| | | | |
|---|---|---|---|
| 4,984,076 | 1/1991 | Watanabe et al. | 358/12 |
| 5,016,107 | 5/1991 | Sasson et al. | 358/909 |
| 5,027,214 | 6/1991 | Fujimori | 358/909 |
| 5,034,804 | 7/1991 | Sasaki et al. | 358/335 |
| 5,068,744 | 11/1991 | Ito | 358/335 |

Primary Examiner—James J. Groody
Assistant Examiner—Glenton B. Burgess
Attorney, Agent, or Firm—E. T. Barrett

[57] ABSTRACT

In a filmless digital camera, each image is individually evaluated and the compression applied in such manner as to retain maximum quality while fitting the data into the pre-assigned memory. For example, such a camera may have a stated image storage capacity for designated number of images, for example, thirty-two black and white images. In one embodiment of this invention, the image data is generated as analog data and converted into digital data. These data representing one complete image, are divided into small discrete blocks. Each of these blocks is compressed using one of the standard compression methods such as the discrete cosine transform (DCT). Each block of compressed data is then examined and a determination made as to the quality of an image resulting from such compression. If the quality falls below a pre-set standard, the block of data is compressed by an alternate method, for example, by differential coding. The blocks of data that meet the quality requirement, without use of the alternate compression method, are recorded by the first compression method without further processing. Each block of data is coded to indicate the method by which it is compressed. After compression, of the entire image, a computation is mad of the memory storage capacity required for the image. If the required memory is appreciably less than the amount of memory allocated for each image, the compression parameters are adjusted accordingly and the image compressed again. When the memory requirement falls within the established tolerance, the image is recorded. Each block of data is encoded to indicate the method by which it was compressed prior to recording.

17 Claims, 2 Drawing Sheets

FILMLESS DIGITAL CAMERA WITH SELECTIVE IMAGE COMPRESSION

REFERENCE TO RELATED APPLICATIONS

This application is a continuation-in-part of co-pending application Ser. No. 07/650,684 filed Feb. 5, 1991.

BACKGROUND OF THE INVENTION

1. Field of the Invention

This invention relates to a filmless digital camera in which the data representing the images are compressed in such manner as to minimize the creation of artifacts from bright spots or abrupt change in gray level while conserving data storage capacity. More particularly, the invention relates to a filmless camera having a storage capacity for a predetermined number of images and in which the compression algorithm is automatically modified to obtain the maximum fidelity in the reconstituted images while making full utilization of the storage capacity.

2. Description of Related Art

Many different algorithms for compressing image data have been devised to minimize required memory capaicty with minimum loss of image quality. One widely accepted algorithm is the Discrete Cosine Transform (DCT). For many images in different applications that compression method provides acceptable results. However, certain images upon reconstitution display artifacts in portions of the image adjacent to abrupt changes in the gray level. Many other compression methods have been devised but generally have a fixed compression procedure that is applied uniformly to all parts of the image.

Most compression techniques achieve a fairly uniform image quality level by allowing the compression ratio to change. Such techniques are inappropriate for a filmless digital camera that has a fixed amount of digital memory for image storage. The photographer would not know how many pictures could be taken before filling the memory of the camera.

One variation of the Discrete Cosine Transform is known as Adaptive DCT. The goal of the adaptation is to make the quality more uniform over the area of the image. However, an adaptive DCT would aggravate, rather than alleviate, the problem of variable compression ratio.

U.S. Pat. No. 5,034,804 to Sasaki et al. describes a digital camera in which image data from an A/D converter are recorded on a memory card serving as a recording medium. No method for controlling the quantity of recorded data for each image while providing maximum picture quality is suggested. Because of the use of replaceable memory cards, there is no need to tailor the size of the image data to record a predetermined number of images in a fixed memory base.

U.S. Pat. No. 5,016,107 to Sasson et al. also discloses the use of a memory card for recording digital image data. Again, there is no common fixed-limit memory for recording a fixed number of images. No selective compression of the images is disclosed.

U.S. Pat. No. 5,027,214 to Fujimori describes an imaging system in which a data compressing section causes variable-length encoding data compression of the digital signal. The compression results in a variable amount of digital data for different images. These data are recorded in a memory having a fixed capacity. Accordingly, the number of images that can be recorded is not known in advance, because the amount of data resulting from the compression varies from image to image. Computations provided by the Fujimori structure enables the photographer to know whether an electronic image to be newly photographed can be recorded or not. This is a device for telling the photographer he has, in effect, run out of film. Fujimori does not adjust the data recorded from the images in order to fit a predetermined number of images into the available memory. In the Fujimori patent the image data are first pre-processed using a differential pulse code that is followed by a compression step using the discrete cosine transform. Every image is processed in this manner. There is no disclosure of performing a compression operation and making a decision dependent upon the results of that compression to control the manner in which each particular image is to be treated in order to provide maximum quality while accommodating a pre-set number of images in the fixed memory. Fujimori does not suggest using the number of non-zero digital coefficients for selecting subsequent compression procedures.

U.S. Pat. No. 5,068,744 to Ito describes a still camera recording procedure in which the image is divided into data blocks and each block is individually recorded. Picture components, such as the AC and DC components, are individually recorded.

None of the earlier patents discloses the computation of a measure bearing a pre-established relation to the creation of artifacts upon the decompression of the image data as here proposed by applicant.

SUMMARY OF THE INVENTION

In a digital filmless camera it is important for the user to known in advance exactly how many images can be recorded on the available memory. To record a practical number of images, it is necessary to compress the data so that less memory is required for each image. If one of the standard compression methods is chosen, it must be selected so that any image can be recorded on a predetermined percentage of the total memory. However, the compression that can be applied to an image, while attaining an acceptable size, varies from image to image.

In accordance with the present invention, each image is individually evaluated and the compression applied in such manner as to retain maximum quality while fitting the data into the pre-assigned memory. Such a camera may have a stated image storage capacity for a designated number of images, for example, thirty-two gray scale images. Conventional compression techniques achieve a uniform image quality, but have widely varying compression ratios depending upon the content of the image. If one of those methods is used, the Quality Factor is fixed and must be set so that even in the case of the lowest compression ratio, no image requires more than the fixed memory allocated to each image to avoid the possibility of exceeding the memory capacity before all of the exposures have been made. The result is that images of a kind that could have been compressed at a higher Quality Factor and still fit within the allocated memory are compressed to the lower fixed quality required by the worst case image. In other words, applying the same compression steps to each image, irrespective of the character of the image, results in inefficient use of the memory.

One family of compression techniques achieves most of the compression by selectively reducing the precision of either the phase or amplitude of the high spatial frequency components of the image. One of the most common techniques in this family is the Discrete Cosine Transform. The "Pyramid Transform" is another example in this family.

The family of compression techniques that includes the DCT in general result in higher perceived quality for a given compression ratio than other usual techniques. However, the DCT family can create objectionable artifacts in portions of an image where the exact phase and amplitude of the high frequency components are important. The worst example is a single bright pixel. Other examples are a bright line, or sharp edge between bright and dark areas. Because these examples have significant energy at all frequencies, the DCT family also achieves a low compression ratio.

By counting the number of non-zero high frequency coefficients after quantization, it is possible to detect blocks that are likely to create artifacts when compressed by the DCT family of compression techniques. To reduce the generation of artifacts, an alternative method of compression that is not in the DCT family, may be selectively applied to these blocks.

For example, in one embodiment of this invention, the image data are generated as analog data and converted into digital data. These data representing one complete image, are divided into small discrete blocks. Each of these blocks is compressed using one of the standard compression methods such as the discrete cosine transform (DCT). Each block of compressed data is then examined and a determination made as to the probability of artifacts resulting from such compression. If the probability of artifacts is above a pre-set standard, the block of data is compressed by an alternate method, for example, by differential coding. This may result in an increased memory requirement for the blocks recorded by the alternate method. The blocks of data that are below the artifact threshold are recorded by the first compression method. Each block of data is coded to indicate the method by which it is compressed.

Prior to actual recording, the Quality Factor is adjusted to achieve a uniform image size. The Quality Factor sets the compression parameters used by both compression techniques and by the process selecting the compression techniques. The image is compressed with a trial Quality Factor. If the image uses significantly less memory than the amount allocated for each image, the Quality Factor is increased. If the image uses significantly more memory than the amount allocated for each image, the Quality Factor is decreased. This process is repeated until the compressed image is an acceptable size. By this means, the highest quality images are attained consistent with the allocated memory requirements.

In summary, (a) a Quality Factor may be used to select compression parameters; (b) for a given Quality Factor, the compressed image size may vary greatly, typically by a factor of three to one, based on the content of the particular image; (c) the Quality Factor may be adjusted to achieve an acceptable image size for any particular image; also (d) the results of the DCT compression for any block of image data may be used to estimate the probability of the generation of artifacts; and (e) an alternative compression method may be applied to those blocks with a probability of artifacts above a threshold selected by the Quality Factor. Based on these facts, the multiple compression and Quality Factor selection processes of the present invention provide optimum image quality while insuring that a predetermined number of images will fit in a predetermined amount of memory and at the same time reducing the probability of artifacts from DCT compression.

DESCRIPTION OF THE PREFERRED EMBODIMENT

Figure 1:
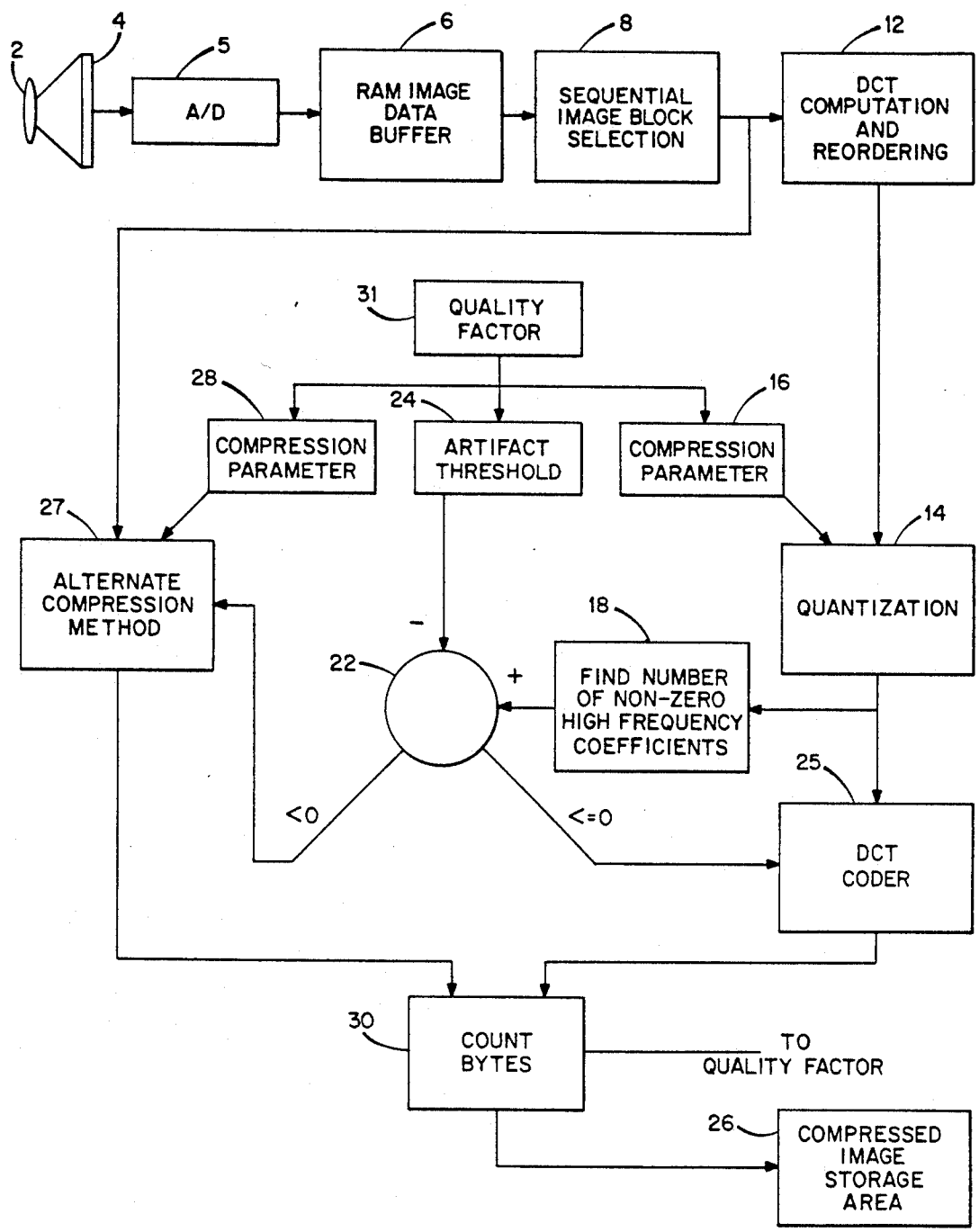
FIG. 1 is a block diagram of the primary elements of a camera embodying the invention.

In this example, the digitized image from the detector of a digital camera is stored and compressed to a predetermined size range by adjusting an overall Quality Factor. The Quality Factor is determined by performing trial compressions at different Quality Factors. During compression, two techniques are available. The first technique is from the DCT family and the second is not from the DCT family. Artifacts from points, lines and edges, normally produced by DCT-like compression are suppressed by selectively switching to the non-DCT-like compression. The Quality Factor selects the quantization parameters for compression and for the threshold that selects the compression technique.

In particular, in this example the image data is divided into blocks of typically 8 by 8 pixels. A first compression of each image data block is by the DCT method. After quantization using the compression parameters selected from a table by the current Quality Factor, the number of non-zero high frequency components is counted. In this example, high frequency coefficients are all coefficients except the four by four block of coefficients nearest to the DC coefficient. If this number exceeds a threshold value, also selected from a table by the current Quality Factor, the block is recompressed using an alternative compression that may require more space in the memory but will not produce objectionable artifacts in the decompressed image. Run-length encoding of quantized pixel to pixel differences, usually referred to as differential encoding. is a suitable alternative compression technique. The compression technique used for each block is indicated by the addition of a single bit at the start of the compressed block. For the purposes of this description and the claims, the expression "alternate compression" means compression by an algorithm other than one belonging to the DCT family.

The compression parameters for the DCT compression set the quantization level for each DCT coefficient. These quantization levels are set by sensitivity studies, such as those published in the JPEG compression standard. To form the table of compression parameters, the quantization levels may be uniformly scaled. The threshold value used to control the switch to alternative compression may typically range from 4 to 24 non-zero coefficients, as the Quality Factor ranges from highest quality to lowest quality.

If such a camera is to have an assured capacity for a designated number of images, each image must be limited in memory to an allocated percentage of the total. For example, a filmless camera having a capacity for thirty-two still images would provide an available capacity for each frame equal to the total memory capacity divided by thirty two. However, if an arbitrary standard is used to determine which blocks are to be compressed by the more memory-expensive procedure, some images will be compressed into significantly less memory than is available with a resulting image of less than optimum quality. Accordingly, the standard for selecting the blocks to be compressed by the alternate procedures is variable and is automatically adjusted to provide the highest reconstituted image quality without exceeding the allocated memory capacity.

Simultaneously the compression parameters of the DCT and, optionally the alternative compression, are adjusted to yield a uniform image quality. In the case of the DCT compression, the compression parameters set the quantization level of the coefficients. For the alternative compression, in the case of difference encoding, the compression parameters may set the quantization of the differences.

In this example, the Quality Factor may range from zero to four. The compression parameters and artifact threshold associated with a Quality Factor of zero are selected so that a worst case image will compress to an acceptable size. The compression and threshold parameters used with Quality Factors one to four are set to increase compressed image size by approximately 33% for each step. Acceptable image size is then set to range from a maximum of memory size divided by the number of pictures to slightly less than 75% of that maximum.

In this example, the image would first be compressed with a Quality Factor of two. If the compressed image is of acceptable size, as defined above, the Quality Factor has been found and this trial process is terminated. If the compressed image is too large, the Quality Factor is decremented and the trial process is repeated. If the compressed image size is too small, the Quality Factor is incremented and the trial process is repeated. In any case, this trial process is terminated after three cycles. The image is then compressed and stored with the current Quality Factor.

The primary elements of the digital camera are illustrated diagrammatically in FIG. 1. An image sensor is a device that can produce a two dimensional map of values correlated to light intensity as a function of the position on the sensor in two dimensions. Image sensors include vidicons, plumbicons, CCD's (including Full Frame, Frame Transfer, and Interline Transfer), Charge Injection Devices (CID), MOS detectors (which use a Metal Oxide Semiconductor to read out a photoresistor), PhotoFET arrays, FET selected diode arrays, and Bulk Charge Modulated Devices (BCMD). In this example, the image sensor 4 is a Charge Coupled Device (CCD).

The coefficients are quantized in accordance with known procedures based on sensitivity studies. The majority of coefficients are zero after quantization. Typically, five to ten of the 64 coefficients representing one block have a finite non-zero value. Preferably a variable quantization factor is used to increase or decrease the amount of compression achieved.

Figure 2:
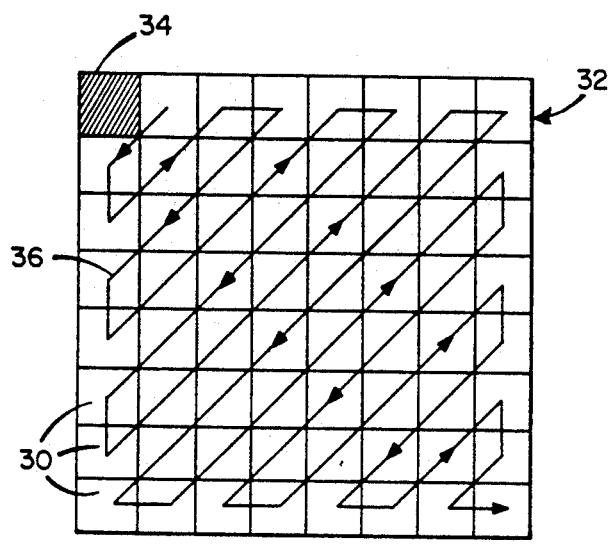
FIG. 2 is an illustration of one block of data from an image showing the scanning sequence.

The non-zero coefficients are ordered in the zig-zag scan shown in FIG. 2. The coefficient information is represented by two components for each value (a) the relative location of each non-zero coefficient; and (b) the actual number of the non-zero coefficients, that is, a five bit code followed by a three bit code. This data is Huffman coded.

The compression procedure reference above is for he most part conventional and well known in this field. However, the DCT method of compression frequently results in artifacts caused by bright points or edges in the image being recorded. These artifacts are usually in the form of a checkerboard pattern in the reconstituted image in the blocks containing these abrupt changes in intensity of the image.

It is possible to avoid this objectionable feature of DCT compression by using an alternative compression method that does not produce the artifacts. But the use of such a compression method significantly increases the amount of memory required to record the data from each image. For example, the DCT method can provide, for example, a compression ratio of nine to one. An alternative method, such as differential coding, might provide a compression ratio of one two or three to one. However, it is an object here to store as many images as possible while, for reasons of economy, limiting the memory to the smallest capacity consistent with acceptable image quality. Accordingly, it is desirable to use the DCT compression method (or similar technique) wherever it can be utilized without excessive degradation of the image quality.

In accordance with the present procedure, the DCT method is adopted for most blocks of data, but selected blocks most likely to give rise to artifacts are identified and compressed by an alternate method that does not give rise to the objectionable artifacts.

Those blocks of data that after DCT compression and quantization contain the higher number of non-zero coefficients are the ones most likely to cause artifacts on decompression. If the number of the non-zero coefficients of a block exceeds a pre-established threshold selected to provide the desired level of quality, the data is not compressed using the DCT algorithm, but is compressed by an alternate method such as differential coding. To enable correct decompression methods to be employed, each recorded block carries a one new bit code to indicate the method by which it was compressed. The bits designating the method of compression of each block may be included in the image memory or may be recorded in a separate reference table.

The data representing the image passes from the image sensor 4 through an analog-to-digital converter 5 and a buffer 6 to a sequential image block selection circuit 8. The image is compressed in a sequential mode of operation in which it is processed from top to bottom in a single pass by compressing the first row of blocks followed by the second row of blocks and continuing until the end of the image is reached. To facilitate this process, the block selection circuit 8 divides the image into square or rectangular blocks of uniform size. In this particular environment, each block represents a square of eight pixels on each side. Each block of data from the image selection circuit 8 is fed into a DCT compression circuit 12 where the data is compressed by the DCT method by at least 50%. The compressed block of data is then quantized by a quantization circuit 14 under the control of a compression parameter circuit 16. After quantization, the data representing one block of the image is analyzed by a frequency analyzer circuit 18 that counts the number of non-zero coefficients in the block. This information is fed into a compression decision circuit 22. Based upon the threshold provided by an adjustable artifact threshold control circuit 24 that is coupled to the compression decision circuit 22: (a) If the number of non-zero coefficients is below this threshold, the data representing that block is passed directly to a DCT coder 25 that encodes the quantized coefficient data and indicates that this particular block was compressed by DCT method. The bytes used by the encoded data are counted by the counter circuit 30 and (a) the encoded block of data is then recorded in the compressed image storage area 26; (b) or if the number of non-zero coefficients exceeds the threshold value, the block of data signals is relayed to an alternate compression circuit 27 where the block of data is compressed by an alternate method, such as differential coding, that does not produce objectionable artifacts in the reconstituted image. The amount of compression produced by the alternate compression circuit 27 is controlled by an adjustable parameter control circuit 28. Circuit 27 also adds a bit of data to indicate alternate compression. The data from this alternate compression method is passed through the byte counter 30 and then into the compressed image storage area 26.

A Quality Factor circuit 31 adjusts the compression parameter circuits 16 and 28 and sets the level of the artifact threshold circuit 24. It will be understood that, in practice, the functions represented between the buffer 6 and the memory 26 are not performed by separate electronic circuits but rather represent for the most part the functions performed by the software controlling the compression process.

The Discrete Cosine Transform of an 8×8 pixel image block produces an 8×8 block of DCT coefficients. These coefficients from one block of the image may be represented by the small squares 30 of a data block, generally indicated at 32 in FIG. 2. Each one of the small squares 30 represents a DCT coefficient. The upper left hand coefficient 34 represents the average spatial intensity of the block and is referred to as the DC coefficient. After the DCT coefficients are quantized, but before they are entropy encoded, DC prediction is performed, meaning that the DC term of the previous block is subtracted from the DC term of the present block prior to encoding.

Thus, each block is first compressed by the DCT method, quantized and subjected to the sequential scan indicated in FIG. 2. The high-frequency non-zero coefficients are then counted and the count compared with a preselected threshold. If the number of the non-zero coefficients exceeds the threshold, indicating that a particular block will contribute to an objectionable checker board pattern, the block is compressed by an alternate method rather than by the DCT method.

In the camera, an equal amount of memory is allocated for each image to be captured. If, for example, the camera is to have a capacity to store up to 32 images, one thirty-second part of the memory capacity will be allocated for each image. A particular image may be such that the number of data blocks having a sum of non-zero coefficients exceeding the established threshold is very large so that the above procedure would require greater memory capacity for storage than that allocated for the image. Alternatively, a particular image may have a very low sum of non-zero coefficient and require only a small part of the allocated memory.

To obtain optimum quality in the reproduced images, it is desirable to use as much of the allocated memory as possible without exceeding the memory allocation. This result is attained by first applying an arbitrary compression-determination threshold and computing the memory capacity required to store the compressed image. If this value is near the allocated memory capacity, that threshold is used as the basis for determining which blocks will be compressed by the alternative method. If the indicated memory requisite for recording exceeds the memory allocation, a higher quantization factor and a new threshold are selected and the memory requirement again computed. This process is repeated until the memory requirement is near the maximum of the allocated capacity and each block is compressed and recorded by either the DCT or the alternate method based on that threshold. If the indicated memory requirement is significantly smaller than the memory allocation, a new lower scale factor and a new threshold standard are used until the memory requirement approaches the allocated capacity. An optimum combination of quantization scale factors and thresholds is empirically determined to obtain the desired size of compressed images with few iterations, typically two.

Figure 3:
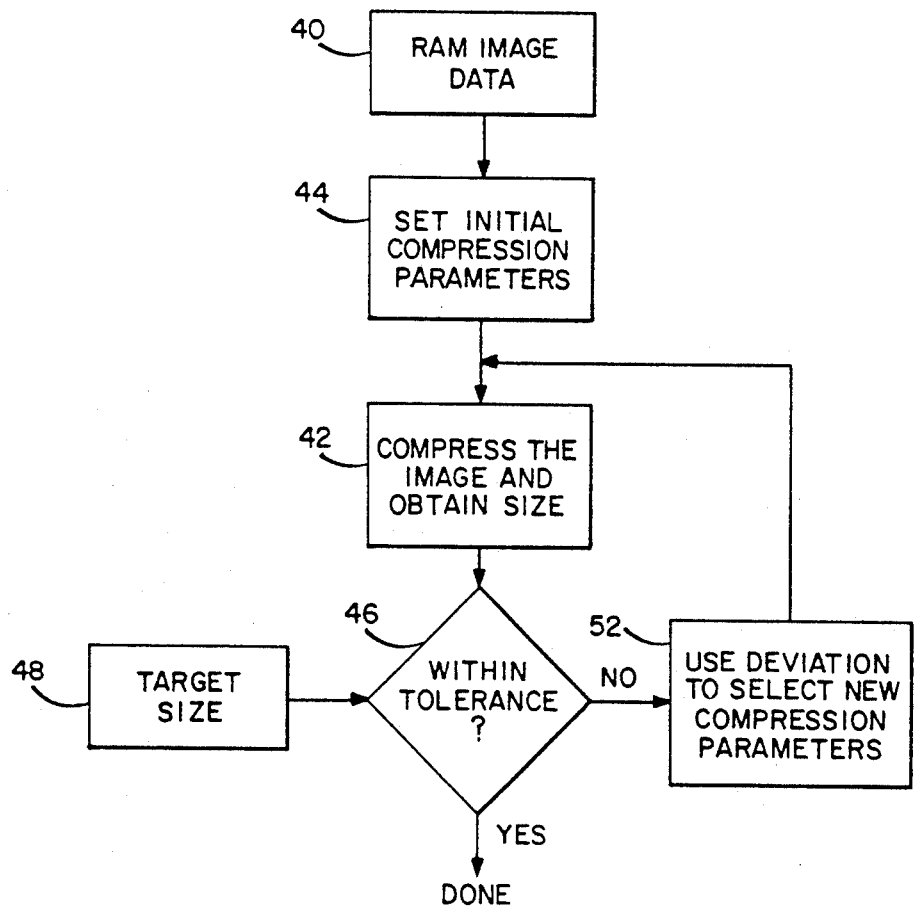
FIG. 3 is a block diagram illustrating the mode of operation for compressing each image.

After each data block has been examined and the method of compression selected, the data from the entire image is analyzed after compression by a memory measuring circuit 30 (FIG. 1) to determine the total memory requirement. The amount of compression of the image is adjusted to provide the highest image quality consistent with the allocated memory. As illustrated by FIG. 3, the image data is fed from a block 40 into compression circuits 42 where the image is compressed in accordance with the procedure set forth above, the initial degree of compression being established by the compression parameter control circuit 44. After compression, the image data is fed into a memory evaluator 46 where the computed memory requirements are compared with a target size established by the memory control circuit 48. If the projected memory is within the tolerance limits of the memory control circuit, the data is recorded without further processing. If the image data requires significantly more or less memory than that allocated for the image, the amount of compression is adjusted by a secondary parameter control circuit 52 that establishes a new compression parameter as a function of the deviation of the memory requirement from the amount of memory allocated for the image. The image is then returned to the compression circuits 42 where it is compressed in accordance with the revised compression parameter. This process may, if necessary, be repeated more than once to bring the memory requirements within the pre-established tolerance.

It is not always necessary to evaluate all data blocks to arrive at the highest Quality Factor that will produce a compressed image that is smaller than the per picture memory allocation. For example, if we number the rows of blocks from top to bottom, and the columns of blocks from left to right, we may perform trial compressions on only those blocks with an odd column and an odd row number, or a total of one-quarter of all blocks. For common image sizes, even a more sparse sample of data blocks will be statistically valid.

The process for treating each image is as follows: The Quality Factor is set to a mid-range value. The Quality Factor is represented by an integer with a range from zero to some small number. The mid-range Quality Factor might be three, for example. The image data is divided into data blocks representing the physical area of the image. The first sample block is then compressed with DCT with the Quality Factor set at its mid-range value. If the test for poor DCT at that Quality Factor is true, based on the number of non-zero coefficients in the block after quantization, the block is recompressed with the alternate mode of compression. However, if the test for poor DCT at the set Quality Factor is false, the output of the DCT is encoded to indicate the DCT mode of compression. The number of bytes of memory required to record the block is then computed.

After each sample block has been processed and the total number of bytes of the sample blocks determined, the memory required to record the entire image is then determined. If this is within the tolerances for the allocated image memory, the data is recorded in the memory. If the image would require memory in excess of the allocated memory, the Quality Factor is reduced and the image is compressed again. If the memory requirement is less than the tolerance of the allocated memory capacity, the Quality Factor is increased and the image is compressed again. When the memory required for the total image is within the allocated memory tolerance, the image is recorded.

The test for poor DCT at the Quality Factor means to apply a test that is a function of the Quality Factor to the output of the DCT compression. For example, count the number of high frequency terms from the DCT after quantization and compare with a table of integers produced by the Quality Factor. If the number of high frequency terms is greater than the integer in the table for the current Quality Factor, this would indicate a "poor" DCT.

I claim:

1. In a filmless digital camera in which a predetermined number of images are captured by a CCD, that produces digital data representing said images, and stored in a digital memory having a predetermined allocated capacity per image, the method of compressing the digital data comprising the steps of
   dividing the digital data representing one of said images into a series of blocks of predetermined and uniform size each representing a predetermined number of pixels,
   compressing said data representing one of said blocks in accordance with a first predetermined algorithm,
   computing a measure bearing a pre-established relationship to the creation of artifacts upon decompression of said data,
   comparing said measure with a predetermined threshold value and (a) if said measure is less than said threshold, recording said data after compression in accordance with said first algorithm, or (b) if said measure is greater than said threshold, compressing said data as a function of a second algorithm having a characteristic of producing less intense artifacts, and recording said data,
   repeating the above process for each block of said image,
   measuring the memory capacity required for storage of said image and (a) if said memory capacity exceeds said allocated capacity per image by more than a predetermined amount, modifying the parameters of said first algorithm and changing said threshold to reduce the number of blocks compressed by said second algorithm thereby to reduce the memory utilized to record the compressed image, or (b) if said memory capacity is less by a predetermined amount than said allocated capacity, modifying the parameters of said first algorithm and changing said threshold to increase the number of blocks compressed by said second algorithm thereby to increase the memory utilized to record the compressed image, and
   repeating the above process until the memory utilized in recording said image is within predetermined tolerances of said allocated memory.

2. The method as claimed in claim 1 wherein said first algorithm is the DCT method.

3. The method as claimed in claim 2 wherein said second algorithm is the differential code method.

4. In a filmless camera in which a predetermined number of successive images are captured by a CCD that produces digital data representing said images and stored in a digital memory having an allocated capacity per image, a method of compressing the digital data prior to recording comprising
   dividing the data representing one of said images into a series of blocks or predetermined uniform size wherein each block represents a predetermined number of pixels,
   compressing said data representing one of said blocks using a first method of compression,
   quantizing the coefficients from said compressed data and counting the number of non-zero coefficients,
   comparing the number of non-zero coefficients with a pre-established standard and if said non-zero coefficients are greater than said pre-established standard, compressing said data, prior to compressing said data by said first method of compression by a second and different compression method prior to recording it,
   encoding each block of said data to indicate which method of compression has been employed, and
   recording the data whether compressed by said first or by said second method of compression.

5. The method as claimed in claim 4 wherein the first method of compression is the DCT method.

6. The method as claimed in claim 5 wherein said second method of compression is differential coding.

7. In a filmless digital camera in which a predetermined number of images are captured by a CCD that produces digital data representing said images and stored in a digital memory having a predetermined allocated capacity per image, a method of compressing the digital data comprising the steps of
   dividing the digital data representing said image into a series of blocks of uniform size containing a predetermined number of pixels,
   successively compressing the data representing each of said blocks by a DCT method with a predetermined scale factor,
   determining for each block a coefficient index equal to sum of the high frequency non-zero coefficients derived by said DCT method,
   establishing a predetermined threshold number,
   determining whether said coefficient index is greater or smaller than said threshold number,
   compressing said data for each of said blocks by the differential coding method if said coefficient index exceeds said threshold number by a predetermined amount, and
   recording said data.

8. The method as claimed in claim 7 including the step of
   encoding each block of data to indicate the particular method by which the data were compressed prior to recording.

9. In a filmless digital camera for capturing and storing data representing a number of still images, a combination comprising a frame transfer CCD, a lens system for producing a focused image of a scene to be captured on said CCD, digital data storage means having a predetermined storage capacity allocated for each image captured by said camera, means for dividing the data representing one image into discrete blocks of data each having a predetermined number of pixels, means for computing the DCT of successive blocks of said data, data compression means including means for quantizing the DCT coefficients using a predetermined scale factor, means for determining the sum of selected non-zero coefficients for each of said blocks of data, means for establishing a relationship between a pre-established threshold and the sum of selected non-zero coefficients in the quantized data representing each of said blocks means for selecting particular blocks of said data on the basis of the relationship between the pre-established threshold and the sum of selected non-zero coefficients in the quantized data for each of said blocks, means for compressing each of said blocks of data in accordance with an alternate compression method if said sum exceeds a pre-established threshold, and means for compressing each of said blocks of data by the DCT method if said sum does not exceed said pre-established threshold, and means for storing the data in said digital storage means.

10. A camera as claimed in claim 9 including means for determining the total memory capacity required for said image, means for modifying said pre-established quantization scale factor and said threshold to increase or decrease the memory storage capacity required to store said image to utilize an increased proportion of the allocated memory, and means for repeating the foregoing process until the compressed image is within the preset tolerances of the storage capacity allocated for such image.

11. An image comparison system comprising means for generating a digital block of data representing part of an image to be compressed, primary compression means for compressing said data block in accordance with a first algorithm that compresses the data by at least 50%, secondary compression means for compressing said data block in accordance with an alternate algorithm that would on decompression produce less significant artifacts than said primary compression means, measuring means for measuring the amount of data from said primary compression means representing high spatial frequencies in the image data, compression control means responsive to said measuring means for deciding whether said data block is compressed by said primary compression means or said secondary compression means, and means for recording the compressed data block.

12. The system as claimed in claim 11 wherein
said primary compression means uses the DCT algorithm.

13. The system as claimed in claim 11 wherein
said compression control means is controlled as a function of the number of high frequency terms in the compressed data from said primary compression means.

14. The system as claimed in claim 13 wherein
said primary compression means uses the DCT algorithm,.

15. An image compression system comprising means for producing a block of digital data representing a portion of an image, quality factor control means, primary compression means under the control of said quality factor control means for compressing said data block in accordance with a first algorithm that reduces the data in spatially high frequencies but which upon decompression produces visually objectionable errors from bright points in said image, secondary compression means for compressing said data block in accordance with an alternate algorithm that on decompression does not produce objectionable errors from bright spots in said image, measuring means for measuring the amount of data from said primary compression means resulting from high spatial frequencies in the image data, compression control means responsive to said measuring means for controlling whether said data block is compressed by said primary compression means or said secondary compression means.

16. An image compressing system as claimed in claim 15 including means for adjusting the control value of said quality factor control means, and wherein said compression control means is responsive to the control value of said quality control factor.

17. An image compression system as claimed in claim 15 including means for producing a plurality of blocks of said digital data which together represent an entire image, memory measuring means for determining the memory required to store all of said blocks after each has been compressed by either said primary or said secondary compression means, compression adjustment means for (a) decreasing the amount of compression of all of said blocks if the required memory exceeds a predetermined value, or (b) increasing the amount of compression of all of said blocks if the required memory is less than said predetermined value by a predetermined amount, and means for repeated operation of said compression adjustment means until said required memory is less than said predetermined value by no more than preset tolerance.

* * * * *